United States Patent
Horiuchi

(10) Patent No.: US 9,340,073 B2
(45) Date of Patent: May 17, 2016

(54) PNEUMATIC RUN FLAT TIRE

(75) Inventor: Kenji Horiuchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 356 days.

(21) Appl. No.: 13/604,458

(22) Filed: Sep. 5, 2012

(65) Prior Publication Data

US 2013/0075003 A1 Mar. 28, 2013

(30) Foreign Application Priority Data

Sep. 28, 2011 (JP) .................. 2011-213254

(51) Int. Cl.
*B60C 17/00* (2006.01)
*B60C 3/06* (2006.01)
*B60C 9/22* (2006.01)
*B60C 15/00* (2006.01)
*B60C 9/00* (2006.01)
*C08K 5/372* (2006.01)

(52) U.S. Cl.
CPC ............. *B60C 15/0018* (2013.04); *B60C 9/005* (2013.04); *B60C 9/22* (2013.01); *B60C 15/0054* (2013.04); *B60C 17/0018* (2013.04); *C08K 5/372* (2013.01); *B60C 2001/0033* (2013.04); *B60C 2009/2038* (2013.04); *B60C 2015/0617* (2013.04); *B60C 2015/0621* (2013.04); *B60C 2017/0063* (2013.04); *Y10T 152/10504* (2015.01)

(58) Field of Classification Search
CPC .. B60C 17/0009; B60C 17/0018; B60C 1/00; B60C 9/005; B60C 9/22; B60C 3/06; B60C 15/06; B60C 2001/0033; B60C 2017/0063; B60C 2015/0617; B60C 2015/0696; B60C 17/00; Y10T 152/10504
USPC .................. 152/517, 527, 531, 541, 455, 456
See application file for complete search history.

(56) References Cited

U.S. PATENT DOCUMENTS

| 4,203,481 | A  | * | 5/1980  | Ranik, Jr. ...................... 152/517 |
| 7,278,455 | B2 | * | 10/2007 | Hedo et al. ................ 152/517 X |
| 7,703,493 | B2 | * | 4/2010  | Willard, Jr. ............... 152/517 X |

FOREIGN PATENT DOCUMENTS

JP 2010-023823 2/2010

* cited by examiner

*Primary Examiner* — Adrienne C Johnstone
(74) *Attorney, Agent, or Firm* — Thorpe North & Western

(57) ABSTRACT

A pneumatic run flat tire includes an inner side reinforcing rubber layer having a falcated cross-section and an outer side reinforcing rubber layer having a center of gravity position in a meridian cross-section that is positioned inward in a tire radial direction of a tire maximum width position disposed in a side wall portion. Volumes of the inner side reinforcing rubber layer and the outer side reinforcing rubber layer are each different on a vehicle inner side and a vehicle outer side when mounted on a vehicle.

20 Claims, 1 Drawing Sheet

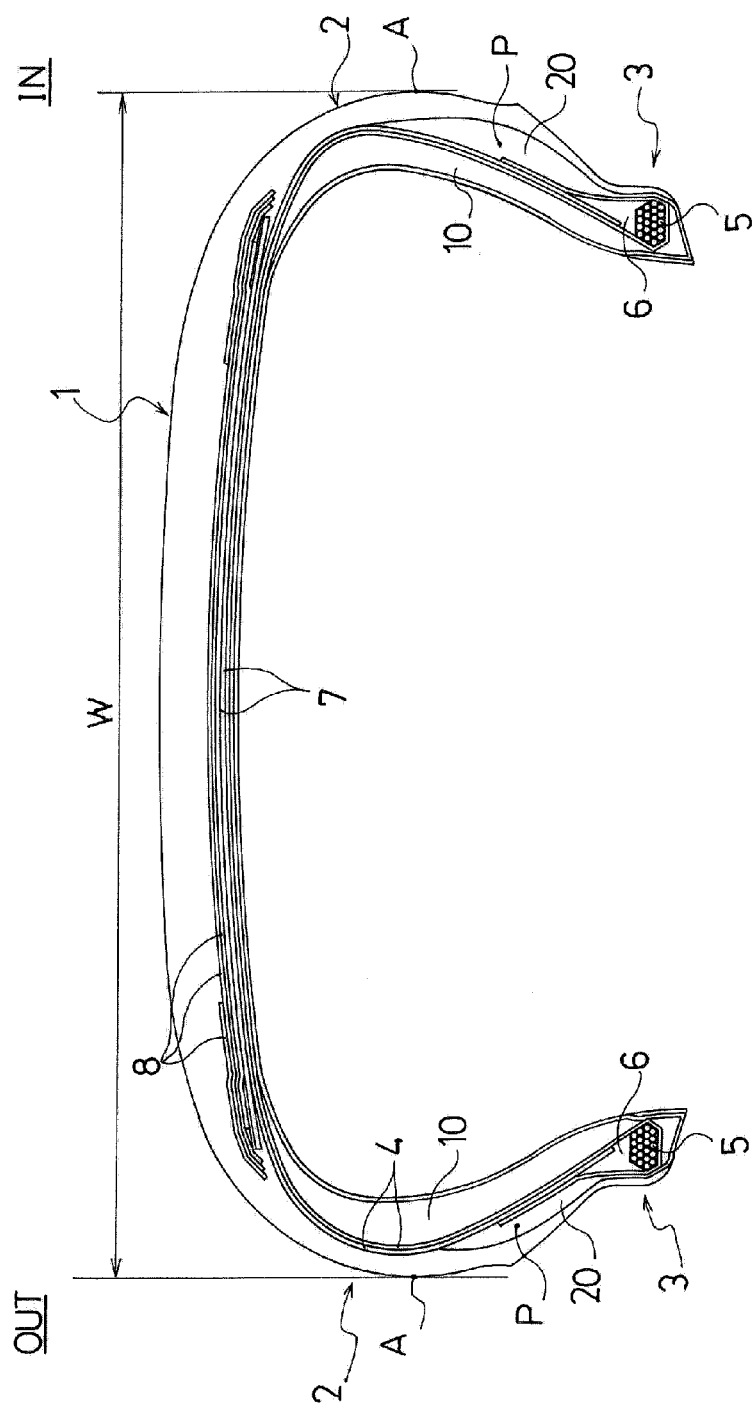

PNEUMATIC RUN FLAT TIRE

PRIORITY CLAIM

Priority is claimed to Japan Patent Application Serial No. 2011-213254 filed on Sep. 28, 2011.

BACKGROUND

1. Technical Field

The present technology relates to a pneumatic run flat tire and more particularly relates to a pneumatic run flat tire by which riding comfort when regular traveling can be maintained at a high level and run-flat durability can be enhanced.

2. Related Art

With pneumatic tires, a side-reinforced pneumatic run flat tire in which a reinforcing rubber layer having a falcated cross-section is inserted on an inner face of a side wall portion, and by which run-flat traveling is made possible based on the rigidity of this reinforcing rubber layer is known (e.g. see Japanese Unexamined Patent Application Publication No. 2010-023823A). With such a side-reinforced pneumatic run flat tire, there is a benefit in that run-flat traveling is achieved based on the tire structure without depending on a support body such as an inner ring or the like attached to the wheel, but there is also a problem in that the rigidity of the side wall portion is higher than that of a regular tire and, therefore, riding comfort when regular traveling is negatively affected.

Therefore, in recent years, what are referred to as "soft run-flat tires" have been used in which the same degree of riding comfort as in a tire that does not have a reinforcing rubber layer is maintained while at least the minimum necessary run-flat durability is ensured by miniaturizing the reinforcing rubber layer as much as possible without inhibiting run-flat durability or reducing the rigidity. However, with such a run flat tire in which the reinforcing rubber layer is miniaturized or the rigidity thereof is reduced, the run-flat durability may decline severely, and there remains room for improvement in achieving both run-flat durability and riding comfort when regular traveling.

Additionally, when mounting such a run flat tire on a vehicle provided with a camber angle, and particularly when mounting the run flat tire on a vehicle provided with a negative camber angle, there is a problem in that it is difficult to ensure run-flat durability because the side wall portion positioned on a vehicle inner side is subjected to a large load.

SUMMARY

The present technology provides a pneumatic run flat tire by which riding comfort when regular traveling can be maintained at a high level and run-flat durability can be enhanced. A pneumatic run flat tire of the present technology includes a carcass layer mounted between a pair of left and right bead portions, a belt layer disposed on an outer circumferential side of the carcass layer in a tread portion, and an inner side reinforcing rubber layer having a falcated cross-section disposed on an inner side in a tire width direction of the carcass layer in a side wall portion. In this pneumatic run flat tire, an outer side reinforcing rubber layer is disposed on an outer side in the tire width direction of the carcass layer from the bead portion throughout the side wall portion, a center of gravity position in a meridian cross-section of the outer side reinforcing rubber layer is positioned inward in a tire radial direction of a position where tire width is greatest, and volumes of the inner side reinforcing rubber layer and the outer side reinforcing rubber layer are each different on a vehicle inner side and a vehicle outer side when the pneumatic run flat tire is mounted on a vehicle. Furthermore, a ratio $V1_{out}/V1_{in}$ of a volume $V1_{out}$ of the inner side reinforcing rubber layer on the vehicle outer side to a volume $V1_{in}$ of the inner side reinforcing rubber layer on the vehicle inner side is configured to be from 1.10 to 1.35, and a ratio $V2_{in}/V2_{out}$ of a volume $V2_{in}$ of the outer side reinforcing rubber layer on the vehicle inner side to a volume $V2_{out}$ of the outer side reinforcing rubber layer on the vehicle outer side is configured to be from 1.10 to 1.50.

In the present technology, an inner side reinforcing rubber layer having a falcated cross-section provided on an inner side in a tire width direction of a carcass layer in a side wall portion and an outer side reinforcing rubber layer disposed on an outer side in the tire width direction of the carcass layer from a bead portion throughout the side wall portion are disposed, and a center of gravity position in a meridian cross-section of the outer side reinforcing rubber layer is configured so as to be positioned inward in a tire radial direction of a position where tire width is greatest. As a result, a rim cushion portion can be reinforced by the outer side reinforcing rubber layer. Furthermore, volumes of the inner side reinforcing rubber layer and the outer side reinforcing rubber layer are each different on a vehicle inner side and a vehicle outer side when the pneumatic run flat tire is mounted on a vehicle. Additionally volume relationships between the vehicle inner side and the vehicle outer side of each of the inner side reinforcing rubber layer and the outer side reinforcing rubber layer are configured so that a ratio $V1_{out}/V1_{in}$ of a volume $V1_{out}$ of the inner side reinforcing rubber layer on the vehicle outer side to a volume $V1_{in}$ of the inner side reinforcing rubber layer on the vehicle inner side is from 1.10 to 1.35, and a ratio $V2_{in}/V2_{out}$ of a volume $V2_{in}$ of the outer side reinforcing rubber layer on the vehicle inner side to a volume $V2_{out}$ of the outer side reinforcing rubber layer on the vehicle outer side is from 1.10 to 1.50. Thus, the outer side reinforcing rubber layer is increased on the vehicle inner side where stress concentrates on a rim side when run-flat traveling and, as a result, the rim side is reinforced; and the inner side reinforcing rubber layer is increased on the vehicle outer side where stress concentrates on a shoulder side when run-flat traveling and, as a result, the shoulder side is reinforced. As a result, run-flat durability can be enhanced. Additionally, the volumes of the inner side reinforcing rubber layer and the outer side reinforcing rubber layer at locations other than where stress concentrates are reduced and, as a result, the riding comfort when regular traveling will not be negatively affected and can be maintained at a high level.

In the present technology, of the inner side reinforcing rubber layer, at least the inner side reinforcing rubber layer positioned on the vehicle inner side is preferably constituted by a rubber composition including from 0.2 to 10 parts by weight of a cyclic polysulfide expressed by formula (1) below per 100 parts by weight of a sulfur vulcanizable rubber.

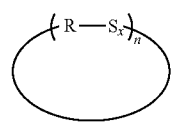

(1)

In this formula, R is a substituted or unsubstituted alkylene group having from 2 to 20 carbons, a substituted or unsubstituted oxyalkylene group having from 2 to 20 carbons, or an alkylene group containing an aromatic ring; n is an integer from 1 to 15; and x is a number from 3 to 5 on average.

As a result, a rubber composition, in which a cyclic polysulfide that can reduce the rate of vulcanization is compounded and which has high resistance to fatigue from flexing and heat resistance, is used for the inner side reinforcing rubber layer on the vehicle inner side, which is configured to be smaller in terms of the volume relationship between the reinforcing rubber layers on the vehicle inner side and the vehicle outer side. Therefore, run-flat durability can be enhanced due to the physical properties of the rubber composition without increasing the volume at locations where the volume of the inner side reinforcing rubber layer is small.

In the present technology, of the outer side reinforcing rubber layer, at least the outer side reinforcing rubber layer positioned on the vehicle outer side is preferably constituted by a rubber composition including from 0.2 to 10 parts by weight of a cyclic polysulfide expressed by formula (1) below per 100 parts by weight of a sulfur vulcanizable rubber.

(1)

In this formula, R is a substituted or unsubstituted alkylene group having from 2 to 20 carbons, a substituted or unsubstituted oxyalkylene group having from 2 to 20 carbons, or an alkylene group containing an aromatic ring; n is an integer from 1 to 15; and x is a number from 3 to 5 on average.

As a result, as described above, a rubber composition, in which a cyclic polysulfide that can reduce the rate of vulcanization is compounded and which has high resistance to fatigue from flexing and heat resistance, is used for the outer side reinforcing rubber layer on the vehicle outer side, which is configured to be smaller in terms of the volume relationship between the reinforcing rubber layers on the vehicle inner side and the vehicle outer side. Therefore, run-flat durability can be enhanced due to the physical properties of the rubber composition without increasing the volume at locations where the volume of the outer side reinforcing rubber layer is small.

In the present technology, the R group in the formula (1) is preferably —$CH_2$—$CH_2$—O—$CH_2$—O—$CH_2$—$CH_2$—.

In the present technology, a tan δ at 60° C. of the rubber composition constituting the inner side reinforcing rubber layer and of the rubber composition constituting the outer side reinforcing rubber layer is preferably from 0.01 to 0.08; and a dynamic elastic modulus E' at 60° C. of the rubber composition constituting the inner side reinforcing rubber layer and of the rubber composition constituting the outer side reinforcing rubber layer is preferably from 4.5 to 13 MPa. By ensuring the elastic modulus and suppressing heat build-up as described above, breakage in the vicinity of the reinforcing rubber layers can be effectively suppressed.

In the present technology, a belt cover layer disposed on an outer side in the radial direction of the belt layer is preferably constituted by a composite cord including two types of organic fibers having differing properties. It is particularly preferable that this composite cord includes an organic fiber having relatively high stretchability and low elastic modulus and an organic fiber having relatively low stretchability and high elastic modulus. By using the belt cover layer constituted by the hybrid cord described above, buckling of the crown portion when run-flat traveling can be effectively suppressed and high-speed durability when run-flat traveling and also riding comfort when regular traveling can be enhanced.

Note that, in the present technology, "tan δ at 60° C." refers to a tan δ measured using a viscoelastic spectrometer (manufactured by Toyo Seiki Seisaku-sho, Ltd.) under the following conditions: Temperature=60° C.; Frequency=20 Hz; Static distortion=10%; Dynamic distortion=±2%. Additionally, in the present technology, "dynamic elastic modulus E' at 60° C." refers to a dynamic elastic modulus measured using the same viscoelastic spectrometer (manufactured by Toyo Seiki Seisaku-sho, Ltd.) mentioned above under the following conditions: Temperature=60° C.; Frequency=20 Hz; Static distortion=10%; Dynamic distortion=±2%.

BRIEF DESCRIPTION OF THE DRAWING

FIG. 1 is a meridian cross-sectional view illustrating a pneumatic run flat tire according to an embodiment of the present technology.

DETAILED DESCRIPTION

Detailed descriptions will be given below of a configuration of the present technology with reference to the accompanying drawing.

FIG. 1 illustrates a pneumatic run flat tire according to an embodiment of the present technology. In FIG. 1, 1 is a tread portion; 2 is a side wall portion; and 3 is a bead portion. Two layers of a carcass layer 4 are mounted between a pair of left and right bead portions 3,3. Ends of the carcass layer 4 are folded around bead cores 5 from a tire inner side to a tire outer side. A bead filler 6 having a triangular cross-sectional shape formed from rubber is disposed on an outer circumferential side of the bead cores 5. Two layers of a belt layer 7 are disposed throughout an entirety of a circumference of the tire on the outer circumferential side of the carcass layer 4 in the tread portion 1. These belt layers 7 include reinforcing cords that incline with respect to a tire circumferential direction and the reinforcing cords are disposed between the layers so as to intersect each other. Furthermore, a belt cover layer 8 is disposed on an outer circumferential side of the belt layers 7. The belt cover layer 8 includes a reinforcing cord that is disposed in the tire circumferential direction, and is constituted by continuously wrapping the reinforcing cord in the tire circumferential direction.

In this pneumatic tire, an inner side reinforcing rubber layer 10 having a falcated cross-section and being formed from rubber is disposed on an inner side in a tire width direction of the carcass layer 4 in the side wall portion 2. The inner side reinforcing rubber layer 10 is configured so as to be harder than the other rubber of the side wall portion 2. A load when run-flat traveling is supported based on the rigidity of the inner side reinforcing rubber layer 10 as a result of providing the inner side reinforcing rubber layer 10 having a falcated cross-section described above. The present technology is applied to such a side reinforced type of pneumatic run flat tire, however the specific structure thereof is not limited to the basic structure described above.

In the present technology, an outer side reinforcing rubber layer 20 is disposed on an outer side in the tire width direction of the carcass layer 4 from the bead portion 3 throughout the side wall portion 2. A center of gravity position P in a meridian cross-section of the outer side reinforcing rubber layer 20 is positioned inward in a tire radial direction of a tire maximum width position A where a tire width W is greatest. As described above, in addition to the inner side reinforcing rubber layer 10 having a falcated cross-section, the outer side reinforcing rubber layer 20 having the center of gravity position P in a meridian cross-section that is positioned inward in the tire radial direction of the tire maximum width position A is provided. Therefore, the vicinity of the bead portion 3 can be particularly reinforced.

If the center of gravity position P in the meridian cross-section of the outer side reinforcing rubber layer 20 is positioned outward in the tire radial direction of the tire maximum width position A, a portion where the inner side reinforcing rubber layer 10 is thick and the outer side reinforcing rubber layer 20 will overlap and the rigidity of the side wall portion 2 will increase considerably. As a result, riding comfort when regular traveling will be negatively affected.

In cases where the pneumatic run flat tire described above is mounted on a vehicle provided with a regular negative camber angle, deformation is great and failures easily occur on the vehicle inner side when run-flat traveling because stress concentrates around the bead portion 3; and, while failures in the vicinity of the bead portion 3 are few on the vehicle outer side, there is a tendency for minor failures to occur in an upper portion of the inner side reinforcing rubber layer 10, that is, in a shoulder portion of the tire. Therefore, in the pneumatic run flat tire of the present technology, volumes of each of the inner side reinforcing rubber layer 10 and the outer side reinforcing rubber layer 20 are configured to be different on the vehicle inner side and the vehicle outer side when the pneumatic run flat tire is mounted on a vehicle. Specifically, a ratio $V1_{out}/V1_{in}$ of a volume $V1_{out}$ of the inner side reinforcing rubber layer 10 on the vehicle outer side to a volume $V1_{in}$ of the inner side reinforcing rubber layer 10 on the vehicle inner side is configured to be from 1.10 to 1.35. Additionally, a ratio $V2_{in}/V2_{out}$ of a volume $V2_{in}$ of the outer side reinforcing rubber layer 20 on the vehicle inner side to a volume $V2_{out}$ of the outer side reinforcing rubber layer 20 on the vehicle outer side is configured to be from 1.10 to 1.50.

By configuring each of the volume relationships between the vehicle inner side and the vehicle outer side of the inner side reinforcing rubber layer 10 and the outer side reinforcing rubber layer 20 as described above, when run-flat traveling, the outer side reinforcing rubber layer 20 on the vehicle inner side, where stress concentrates in the vicinity of the bead portion 3, can be increased and the rim side can be reinforced. On the other hand, the inner side reinforcing rubber layer 10 on the vehicle outer side can be increased and the vicinity of the shoulder portion located in the upper portion of the inner side reinforcing rubber layer 10 can be reinforced. As a result, locations where stress concentrates on each of the vehicle inner side and the vehicle outer side can be reinforced and overall run-flat durability of the pneumatic run flat tire can be enhanced. Additionally, the volume of the inner side reinforcing rubber layer 10 and the outer side reinforcing rubber layer 20 can be comparatively reduced at locations other than where stress concentrates and, as a result, the riding comfort when regular traveling will not be negatively affected and can be maintained at a high level.

If the ratio $V1_{out}/V1_{in}$ of the volume of the inner side reinforcing rubber layer 10 on the vehicle outer side to that on the vehicle inner side is less than 1.10, it will not be possible to sufficiently reinforce the shoulder portion on the vehicle outer side and run-flat durability will decline. If the ratio $V1_{out}/V1_{in}$ of the volume of the inner side reinforcing rubber layer 10 on the vehicle outer side to that on the vehicle inner side is greater than 1.35, the inner side reinforcing rubber layer 10 on the vehicle inner side will be excessively reduced and said location will become extremely weak, thus leading to a decline in the run-flat durability. Additionally, the inner side reinforcing rubber layer 10 on the vehicle outer side will increase excessively and the rigidity will increase, thus leading to a decline in the riding comfort when regular traveling. If the ratio $V2_{in}/V2_{out}$ of the volume of the outer side reinforcing rubber layer 20 on the vehicle inner side to that on the vehicle outer side is less than 1.10, it will not be possible to sufficiently reinforce the vicinity of the bead portion 3 on the vehicle inner side and run-flat durability will decline. If the ratio $V2_{in}/V2_{out}$ of the volume of the outer side reinforcing rubber layer 20 on the vehicle inner side to that on the vehicle outer side is greater than 1.50, the outer side reinforcing rubber layer 20 on the vehicle outer side will be excessively reduced and said location will become extremely weak, thus leading to a decline in the run-flat durability. Additionally, the outer side reinforcing rubber layer 20 on the vehicle inner side will increase excessively and the rigidity will increase, thus leading to a decline in the riding comfort when regular traveling.

In the present technology, as described above, riding comfort when regular traveling is maintained by comparatively reducing the volume of the inner side reinforcing rubber layer 10 and the outer side reinforcing rubber layer 20 at locations other than where stress concentrates. However, in cases where the volume of the reinforcing rubber layers is reduced, there is a possibility that durability with respect to flexing at said locations becomes insufficient and/or over-vulcanization is generated when vulcanizing due to the small rubber volume.

Therefore, in the present technology, of the inner side reinforcing rubber layer 10, at least the inner side reinforcing rubber layer 10 positioned on the vehicle inner side, and of the outer side reinforcing rubber layer 20, at least the outer side reinforcing rubber layer 20 positioned on the vehicle outer side are each preferably constituted by a rubber composition including from 0.2 to 10 parts by weight of a cyclic polysulfide expressed by formula (1) below per 100 parts by weight of a sulfur vulcanizable rubber.

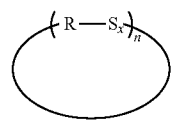

(1)

In this formula, R is a substituted or unsubstituted alkylene group having from 2 to 20 carbons, a substituted or unsubstituted oxyalkylene group having from 2 to 20 carbons, or an alkylene group containing an aromatic ring; n is an integer from 1 to 15; and x is a number from 3 to 5 on average.

By using the rubber composition including the cyclic polysulfide described above for the inner side reinforcing rubber layer 10 on the vehicle inner side and the outer side reinforcing rubber layer 20 on the vehicle outer side (where the volumes of the reinforcing rubber layers are comparatively reduced), the inner side reinforcing rubber layer 10 on the vehicle inner side and the outer side reinforcing rubber layer 20 on the vehicle outer side can be reinforced and run-flat durability can be enhanced due to the superior resistance to fatigue from flexing and heat resistance of said rubber composition. Additionally, over-vulcanization can be suppressed due to the effect of retarding the rate of vulcanization of the rubber composition in which the cyclic polysulfide is compounded and, thus, degradation of physical properties can be avoided.

If the compounded amount of the cyclic polysulfide is less than 0.2 parts by weight, the effect of retarding the rate of vulcanization will be small, and the physical properties of the inner side reinforcing rubber layer 10 on the vehicle inner side and the outer side reinforcing rubber layer 20 on the vehicle outer side will degrade. If the compounded amount of the cyclic polysulfide is greater than 10 parts by weight, the rate of vulcanization will be excessively slow, which will lead to problems in manufacturing.

The rubber composition in which the cyclic polysulfide is compounded is preferably used only for the inner side reinforcing rubber layer 10 on the vehicle inner side and the outer side reinforcing rubber layer 20 on the vehicle outer side. It is possible to use the rubber composition also for the inner side reinforcing rubber layer 10 on the vehicle outer side and the outer side reinforcing rubber layer 20 on the vehicle inner side, but this is not preferable because such a configuration leads to a risk of the rate of vulcanization becoming excessively slow in cases where a large volume of the rubber composition in which the cyclic polysulfide is compounded is used on a side having a large volume.

Any cyclic polysulfide may be compounded, provided it is a cyclic polysulfide expressed by formula (1) above. The R group in formula (1) is preferably —$CH_2CH_2OCH_2CH_2$—, —($CH_2CH_2O)_2CH_2CH_2$—, —($CH_2CH_2O)_3CH$—$CH_2$—, —($CH_2CH_2O)_4$—$CH_2CH_2$—, —($CH_2CH_2O)_5CH_2CH_2$—, —($CH_2CH_2O)_2CH_2$—, or —$CH_2CH_2OCH_2OCH_2CH_2$—. Particularly, x is preferably a number from 3 to 5 on average and more preferably a number from 3.5 to 4.5. n is preferably an integer from 1 to 15, more preferably an integer from 1 to 10, and even more preferably an integer from 1 to 5.

In the present technology, a tan δ at 60° C. of the rubber composition constituting the inner side reinforcing rubber layer 10 and of the rubber composition constituting the outer side reinforcing rubber layer 20 is preferably from 0.01 to 0.08, and more preferably from 0.01 to 0.04. Additionally, a dynamic elastic modulus E' at 60° C. of the rubber composition constituting the inner side reinforcing rubber layer 10 and of the rubber composition constituting the outer side reinforcing rubber layer 20 is preferably from 4.5 to 13 MPa, and more preferably from 4.5 to 9.0 MPa. By stipulating the tan δ and dynamic elastic modulus E' at 60° C. as described above, at least a certain elastic modulus can be ensured and, furthermore, heat build-up can be suppressed. Therefore, breakage in the vicinity of the reinforcing rubber layers can be effectively suppressed.

If the tan δ at 60° C. is less than 0.01, productivity of the pneumatic run flat tire will be negatively affected. If the tan δ at 60° C. is greater than 0.08, it will not be possible to sufficiently suppress heat build-up and run-flat durability will decline. If the dynamic elastic modulus E' at 60° C. is less than 4.5 MPa, the reinforcing rubber layer will not function as a reinforcing layer and run-flat durability will be negatively affected. If the dynamic elastic modulus E' at 60° C. is greater than 13 MPa, vertical rigidity of the side wall portion 2 will increase and, as a result, riding comfort when regular traveling will decrease.

In the present technology, a belt cover layer 8 disposed on an outer side in the radial direction of the belt layer 7 is preferably constituted by a composite cord including two types of organic fibers having differing properties. It is particularly preferable that this composite cord includes an organic fiber having relatively high stretchability and low elastic modulus and an organic fiber having relatively low stretchability and high elastic modulus. By using the composite cord described above for the belt cover layer 8, buckling of the crown portion when run-flat traveling can be effectively suppressed and run-flat durability, steering stability, and riding comfort can be enhanced.

Examples of the organic fibers having relatively high stretchability and low elastic modulus as described above include nylon fibers and the like; and examples of the organic fibers having relatively low stretchability and high elastic modulus include aramid fibers and the like.

EXAMPLES

Ten types of test tires were fabricated for Conventional Examples 1 and 2, Comparative Examples 1 and 2, and Working Examples 1 to 6. These test tires were pneumatic run flat tires having a common tire size of 245/45R17. For each of the inner side reinforcing rubber layer and the outer side reinforcing rubber layer, the presence/absence of each of the reinforcing rubber layers, the volume ratios $V1_{out}/V1_{in}$, and $V2_{in}/V2_{out}$, the presence/absence of the cyclic polysulfide and compounded amount thereof, the tan δ at 60° C., the dynamic elastic modulus E' at 60° C., and the reduction/non-reduction of volume were varied as shown in Table 1. Additionally, the material of the belt cover layer was varied as shown in Table 1. In all of the test tires, the center of gravity position P of the outer side reinforcing rubber layer was disposed inward in the tire radial direction of the tire maximum width position A. Composite fiber constituted by nylon fiber and aramid fiber was used for the hybrid cord. The "reduction/non-reduction of volume" described above indicates whether the total volume of the vehicle inner side and the vehicle outer side of each of the inner side reinforcing rubber layer and the outer side reinforcing rubber layer was reduced in comparison with Conventional Example 2. In cases where the volume was reduced compared to Conventional Example 2 (reduced 5%), "reduced" is shown in Table 1 and in cases where the volume was the same or increased over Conventional Example 2, "not-reduced" is shown in Table 1. Note that the tire of Conventional Example 1 did not include an outer side rubber reinforcing layer and the tire of Conventional Example 2 had an inner side reinforcing rubber layer and an outer side reinforcing rubber layer that were each provided so as to be symmetrical on the vehicle inner side and the vehicle outer side.

Run-flat durability and riding comfort when regular traveling were evaluated for each of the ten types of test tires according to the methods described below. The results are shown in Table 1.

Run-Flat Durability

Each test tire was assembled on a measured rim (size: 17×8.0 J), mounted on a vehicle, and inflated to an air pressure of 230 kPa. The valve core of the right side drive axle tire (one of the four tires) was removed and the vehicle was run on an asphalt road surface test course at an average speed of 80 km/h. Running was continued until the driver felt vibration caused by the breakdown of the tire. Run-flat durability was measured based on the average running distance. Three test drivers performed this measurement and the results were averaged and recorded in Table 1 as evaluations of run-flat durability. Evaluation results were expressed as index values, Conventional Example 1 being assigned an index value of 100. Larger index values indicate superior run-flat durability.

Riding Comfort when Regular Traveling

Each test tire was assembled on a measured rim (size: 17×8.0 J), mounted on a vehicle, and all of the tires were inflated to an air pressure of 230 kPa. Sensory evaluation by a test driver for riding comfort when regular traveling was performed on a test course. Evaluation results were expressed as index values, Conventional Example 1 being assigned an index value of 100. Larger index values indicate superior riding comfort when regular traveling.

TABLE 1

| | | | Conventional Example 1 | Conventional Example 2 | Comparative Example 1 | Comparative Example 2 |
|---|---|---|---|---|---|---|
| Inner side reinforcing rubber layer | Presence/absence of the inner side reinforcing rubber layer | | Present | Present | Present | Present |
| | Volume ratio $V1_{out}/V1_{in}$ | | 1.00 | 1.00 | 1.05 | 1.50 |
| | Presence/absence of the cyclic polysulfide | | — | Absent | Absent | Absent |
| | Compounded amount of the cyclic polysulfide | (phr) | — | — | — | — |
| | tan δ (60° C.) | | 0.9 | 0.9 | 0.9 | 0.9 |
| | Dynamic elastic modulus E' | (MPa) | 14 | 14 | 14 | 14 |
| | Reduction/non-reduction of volume | | — | — | Not-reduced | Not-reduced |
| Outer side reinforcing rubber layer | Presence/absence of the outer side reinforcing rubber layer | | Absent | Present | Present | Present |
| | Volume ratio $V2_{in}/V2_{out}$ | | — | 1.00 | 1.05 | 1.65 |
| | Presence/absence of the cyclic polysulfide | | — | Absent | Absent | Absent |
| | Compounded amount of the cyclic polysulfide | (phr) | — | — | — | — |
| | tan δ (60° C.) | | — | 0.15 | 0.15 | 0.15 |
| | Dynamic elastic modulus E' | (MPa) | — | 14 | 14 | 14 |
| | Reduction/non-reduction of volume | | — | — | Not-reduced | Not-reduced |
| Material of the belt cover layer | | | Nylon fiber | Nylon fiber | Nylon fiber | Nylon fiber |
| Run-flat durability | | (Index) | 80 | 100 | 100 | 96 |
| Riding comfort when regular traveling | | (Index) | 102 | 100 | 100 | 100 |

| | | | Working Example 1 | Working Example 2 | Working Example 3 |
|---|---|---|---|---|---|
| Inner side reinforcing rubber layer | Presence/absence of the inner side reinforcing rubber layer | | Present | Present | Present |
| | Volume ratio $V1_{out}/V1_{in}$ | | 1.20 | 1.20 | 1.20 |
| | Presence/absence of the cyclic polysulfide | | Absent | Present | Present |
| | Compounded amount of the cyclic polysulfide | (phr) | — | 4 | 4 |
| | tan δ (60° C.) | | 0.9 | 0.9 | 0.9 |
| | Dynamic elastic modulus E' | (MPa) | 14 | 14 | 14 |
| | Reduction/non-reduction of volume | | Not-reduced | Not-reduced | Not-reduced |
| Outer side reinforcing rubber layer | Presence/absence of the outer side reinforcing rubber layer | | Present | Present | Present |
| | Volume ratio $V2_{in}/V2_{out}$ | | 1.40 | 1.40 | 1.40 |
| | Presence/absence of the cyclic polysulfide | | Absent | Absent | Present |
| | Compounded amount of the cyclic polysulfide | (phr) | — | — | 4 |
| | tan δ (60° C.) | | 0.15 | 0.15 | 0.15 |
| | Dynamic elastic modulus E' | (MPa) | 14 | 14 | 14 |
| | Reduction/non-reduction of volume | | Not-reduced | Not-reduced | Not-reduced |
| Material of the belt cover layer | | | Nylon fiber | Nylon fiber | Nylon fiber |
| Run-flat durability | | (Index) | 104 | 106 | 108 |
| Riding comfort when regular traveling | | (Index) | 102 | 102 | 102 |

| | | | Working Example 4 | Working Example 5 | Working Example 6 |
|---|---|---|---|---|---|
| Inner side reinforcing rubber layer | Presence/absence of the inner side reinforcing rubber layer | | Present | Present | Present |
| | Volume ratio $V1_{out}/V1_{in}$ | | 1.20 | 1.20 | 1.20 |
| | Presence/absence of the cyclic polysulfide | | Present | Present | Present |
| | Compounded amount of the cyclic polysulfide | (phr) | 4 | 4 | 4 |
| | tan δ (60° C.) | | 0.04 | 0.04 | 0.04 |
| | Dynamic elastic modulus E' | (MPa) | 7.0 | 7.0 | 7.0 |

TABLE 1-continued

| | | | | | |
|---|---|---|---|---|---|
| | Reduction/non-reduction of volume | | Not-reduced | Not-reduced | Reduced |
| Outer side reinforcing rubber layer | Presence/absence of the outer side reinforcing rubber layer | | Present | Present | Present |
| | Volume ratio $V2_{in}/V2_{out}$ | | 1.40 | 1.40 | 1.40 |
| | Presence/absence of the cyclic polysulfide | | Present | Present | Present |
| | Compounded amount of the cyclic polysulfide | (phr) | 4 | 4 | 4 |
| | tan δ (60° C.) | | 0.04 | 0.04 | 0.04 |
| | Dynamic elastic modulus E' | (MPa) | 8.0 | 8.0 | 8.0 |
| | Reduction/non-reduction of volume | | Not-reduced | Not-reduced | Reduced |
| Material of the belt cover layer | | | Nylon fiber | Hybrid fiber | Hybrid fiber |
| Run-flat durability | | (Index) | 114 | 116 | 108 |
| Riding comfort when regular traveling | | (Index) | 102 | 103 | 108 |

As is clear from Table 1, each of the test tires of Working Examples 1 to 6 displayed run-flat durability and riding comfort when regular traveling superior to that of Conventional Example 1 which did not include an outer side reinforcing rubber layer, and that of Conventional Example 2 in which the inner side reinforcing rubber layer and the outer side reinforcing rubber layer were each left-right symmetric. Note that effects of enhancing run-flat durability and riding comfort when regular traveling were not seen in Comparative Examples 1 and 2 where the volume ratio $V1_{out}/V1_{in}$ of the inner side reinforcing rubber layer on the vehicle outer side to that on the vehicle inner side and the volume ratio $V2_{in}/V2_{out}$ of the outer side reinforcing rubber layer on the vehicle inner side to that on the vehicle outer side were outside the ranges specified in the present technology.

Particularly, run-flat durability was enhanced greatly in Working Examples 2 and 3 where the cyclic polysulfide was compounded, Working Example 4 where the tan δ and the dynamic elastic modulus E' of each of the reinforcing rubber layers were within the preferred ranges, and Working Example 5 where a composite cord constituted by nylon fiber and aramid fiber was used as the belt cover layer. Additionally, in Working Example 6, the volume of each of the reinforcing rubber layers was reduced while maintaining the specifications of the tire of Working Example 5. Even so, it was possible to maintain run-flat durability of each of the reinforcing rubber layers at a high level and, additionally, obtain riding comfort superior to that of Conventional Example 1, which did not include the outer side reinforcing rubber layer.

What is claimed is:

1. A pneumatic run flat tire comprising a carcass layer mounted between a pair of left and right bead portions, a belt layer disposed on an outer circumferential side of the carcass layer in a tread portion, and an inner side reinforcing rubber layer having a falcated cross-section disposed on an inner side in a tire width direction of the carcass layer in a side wall portion; wherein
an outer side reinforcing rubber layer is disposed on an outer side in the tire width direction of the carcass layer from the bead portion throughout the side wall portion, a center of gravity position in a meridian cross-section of the outer side reinforcing rubber layer is positioned inward in a tire radial direction of a position where tire width is greatest, volumes of the inner side reinforcing rubber layer and the outer side reinforcing rubber layer are each different on a vehicle inner side and a vehicle outer side when the pneumatic run flat tire is mounted on a vehicle, a ratio $V1_{out}/V1_{in}$ of a volume $V1_{out}$ of the inner side reinforcing rubber layer on the vehicle outer side to a volume $V1_{in}$ of the inner side reinforcing rubber layer on the vehicle inner side is from 1.10 to 1.35, and a ratio $V2_{in}/V2_{out}$ of a volume $V2_{in}$ of the outer side reinforcing rubber layer on the vehicle inner side to a volume $V2_{out}$ of the outer side reinforcing rubber layer on the vehicle outer side is from 1.10 to 1.50.

2. The pneumatic run flat tire according to claim 1, wherein, of the inner side reinforcing rubber layer, at least the inner side reinforcing rubber layer positioned on the vehicle inner side is constituted by a rubber composition comprising from 0.2 to 10 parts by weight of a cyclic polysulfide expressed by formula (1) below per 100 parts by weight of a sulfur vulcanizable rubber:

wherein, R is a substituted or unsubstituted oxyalkylene group having from 2 to 20 carbons; n is an integer from 1 to 15; and x is a number from 3 to 5 on average.

3. The pneumatic run flat tire according to claim 2, wherein the R group in the formula (1) is —$CH_2$—$CH_2$—O—$CH_2$—O—$CH_2$—$CH_2$—.

4. The pneumatic run flat tire according to claim 3, wherein a tan δ at 60° C. of the rubber composition constituting the inner side reinforcing rubber layer and of the rubber composition constituting the outer side reinforcing rubber layer is from 0.01 to 0.08; and a dynamic elastic modulus E' at 60° C. of the rubber composition constituting the inner side reinforcing rubber layer and of the rubber composition constituting the outer side reinforcing rubber layer is from 4.5 to 13 MPa.

5. The pneumatic run flat tire according to claim 4, wherein a belt cover layer disposed on an outer side in the radial direction of the belt layer is constituted by a composite cord comprising two types of organic fibers having differing properties.

6. The pneumatic run flat tire according to claim 1, wherein, of the outer side reinforcing rubber layer, at least the outer side reinforcing rubber layer positioned on the vehicle outer side is constituted by a rubber composition comprising from 0.2 to 10 parts by weight of a cyclic polysulfide expressed by formula (1) below per 100 parts by weight of a sulfur vulcanizable rubber:

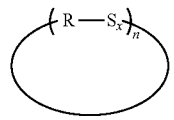
(1)

wherein, R is a substituted or unsubstituted oxyalkylene group having from 2 to 20 carbons; n is an integer from 1 to 15; and x is a number from 3 to 5 on average.

7. The pneumatic run flat tire according to claim 6, wherein the R group in the formula (1) is —CH$_2$—CH$_2$—O—CH$_2$—O—CH$_2$—CH$_2$—.

8. The pneumatic run flat tire according to claim 7, wherein a tan δ at 60° C. of the rubber composition constituting the inner side reinforcing rubber layer and of the rubber composition constituting the outer side reinforcing rubber layer is from 0.01 to 0.08; and a dynamic elastic modulus E' at 60° C. of the rubber composition constituting the inner side reinforcing rubber layer and of the rubber composition constituting the outer side reinforcing rubber layer is from 4.5 to 13 MPa.

9. The pneumatic run flat tire according to claim 8, wherein a belt cover layer disposed on an outer side in the radial direction of the belt layer is constituted by a composite cord comprising two types of organic fibers having differing properties.

10. The pneumatic run flat tire according to claim 1, wherein a tan δ at 60° C. of the rubber composition constituting the inner side reinforcing rubber layer and of the rubber composition constituting the outer side reinforcing rubber layer is from 0.01 to 0.08; and a dynamic elastic modulus E' at 60° C. of the rubber composition constituting the inner side reinforcing rubber layer and of the rubber composition constituting the outer side reinforcing rubber layer is from 4.5 to 13 MPa.

11. The pneumatic run flat tire according to claim 1, wherein a belt cover layer disposed on an outer side in the radial direction of the belt layer is constituted by a composite cord comprising two types of organic fibers having differing properties.

12. The pneumatic run flat tire according to claim 11, wherein the composite cord comprises: an organic fiber having relatively high stretchability and a low elastic modulus and an organic fiber having relatively low stretchability and a high elastic modulus.

13. The pneumatic run flat tire according to claim 1, wherein, of the inner side reinforcing rubber layer, at least the inner side reinforcing rubber layer positioned on the vehicle inner side is constituted by a rubber composition comprising from 0.2 to 10 parts by weight of a cyclic polysulfide expressed by formula (1) below per 100 parts by weight of a sulfur vulcanizable rubber:

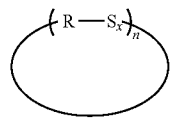
(1)

wherein, R is represented by —CH$_2$CH$_2$OCH$_2$CH$_2$—, —(CH$_2$CH$_2$O)$_2$CH$_2$CH$_2$—, —(CH$_2$CH$_2$O)$_3$CH—CH$_2$—, —(CH$_2$CH$_2$O)$_4$CH$_2$CH$_2$—, —(CH$_2$CH$_2$O)$_5$CH$_2$CH$_2$—, —(CH$_2$CH$_2$O)$_2$CH$_2$—, or —CH$_2$CH$_2$OCH$_2$OCH$_2$CH$_2$—; n is an integer from 1 to 15; and x is a number from 3 to 5 on average.

14. The pneumatic run flat tire according to claim 1, wherein, of the inner side reinforcing rubber layer, at least the inner side reinforcing rubber layer positioned on the vehicle inner side is constituted by a rubber composition comprising from 0.2 to 10 parts by weight of a cyclic polysulfide expressed by formula (1) below per 100 parts by weight of a sulfur vulcanizable rubber:

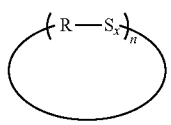
(1)

wherein, R is a substituted or unsubstituted oxyalkylene group having from 2 to 20 carbons; n is an integer from 1 to 15; and x is a number from 3.5 to 4.5 on average.

15. The pneumatic run flat tire according to claim 1, wherein, of the inner side reinforcing rubber layer, at least the inner side reinforcing rubber layer positioned on the vehicle inner side is constituted by a rubber composition comprising from 0.2 to 10 parts by weight of a cyclic polysulfide expressed by formula (1) below per 100 parts by weight of a sulfur vulcanizable rubber:

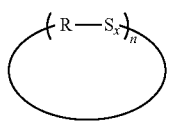
(1)

wherein, R is a substituted or unsubstituted oxyalkylene group having from 2 to 20 carbons; n is an integer from 1 to 10; and x is a number from 3 to 5 on average.

16. The pneumatic run flat tire according to claim 15, wherein n is an integer from 1 to 5.

17. The pneumatic run flat tire according to claim 1, wherein, of the inner side reinforcing rubber layer, at least the inner side reinforcing rubber layer positioned on the vehicle inner side is constituted by a rubber composition comprising from 0.2 to 10 parts by weight of a cyclic polysulfide expressed by formula (1) below per 100 parts by weight of a sulfur vulcanizable rubber:

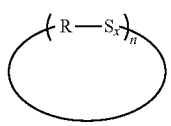
(1)

wherein, R is represented by —CH$_2$CH$_2$OCH$_2$OCH$_2$CH$_2$—; n is an integer from 1 to 5; and x is a number from 3.5 to 4.5 on average.

18. The pneumatic run flat tire according to claim 1, wherein a tan δ at 60° C. of the rubber composition constituting the inner side reinforcing rubber layer and of the rubber composition constituting the outer side reinforcing rubber layer is from 0.01 to 0.04; and a dynamic elastic modulus E' at 60° C. of the rubber composition constituting the inner side reinforcing rubber layer and of the rubber composition constituting the outer side reinforcing rubber layer is from 4.5 to 13 MPa.

19. The pneumatic run flat tire according to claim 1, wherein a tan δ at 60° C. of the rubber composition constituting the inner side reinforcing rubber layer and of the rubber composition constituting the outer side reinforcing rubber layer is from 0.01 to 0.08; and a dynamic elastic modulus E' at 60° C. of the rubber composition constituting the inner side reinforcing rubber layer and of the rubber composition constituting the outer side reinforcing rubber layer is from 4.5 to 9.0 MPa.

20. The pneumatic run flat tire according to claim 1, wherein a tan δ at 60° C. of the rubber composition constituting the inner side reinforcing rubber layer and of the rubber composition constituting the outer side reinforcing rubber layer is from 0.01 to 0.04; and a dynamic elastic modulus E' at 60° C. of the rubber composition constituting the inner side reinforcing rubber layer and of the rubber composition constituting the outer side reinforcing rubber layer is from 4.5 to 9.0 MPa.

* * * * *